Nov. 4, 1930.  P. R. SPILLMAN  1,780,849
SIDING GAUGE AND SCRIBE
Filed Sept. 28, 1928  2 Sheets-Sheet 2
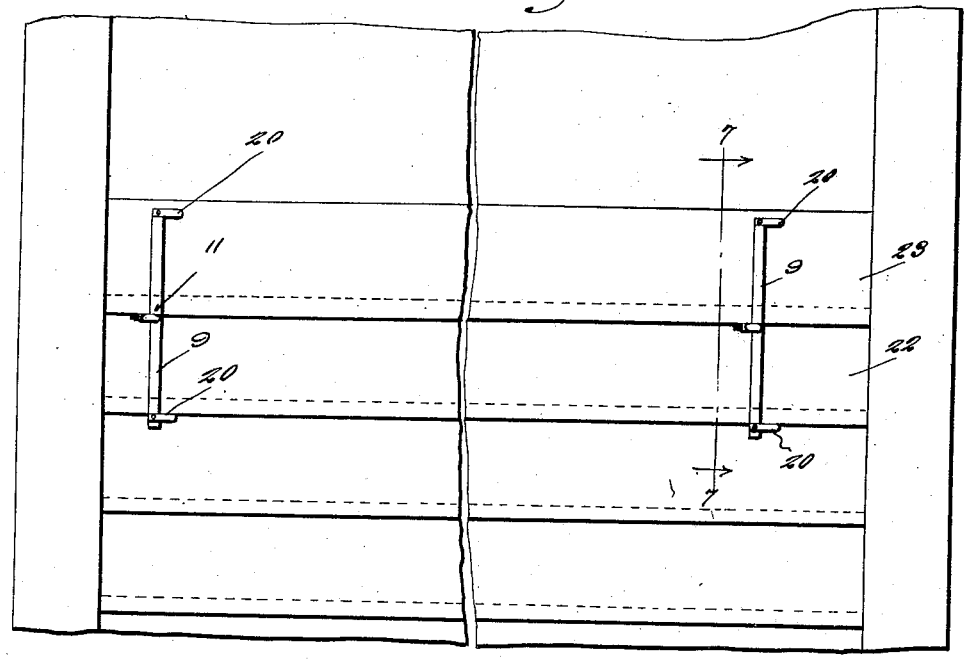
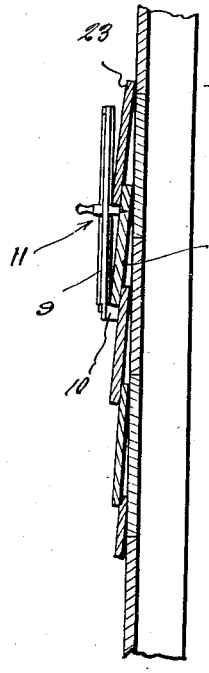
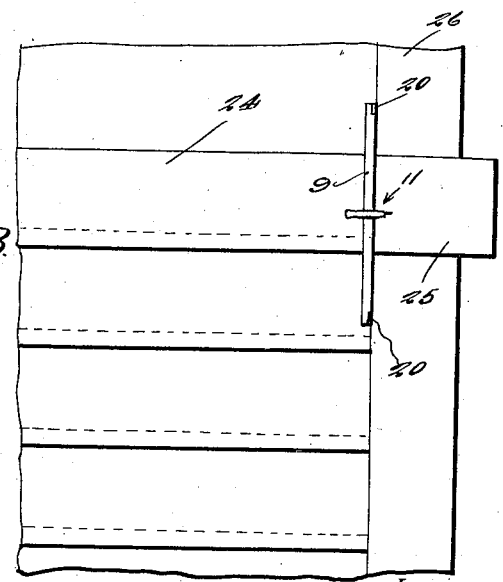

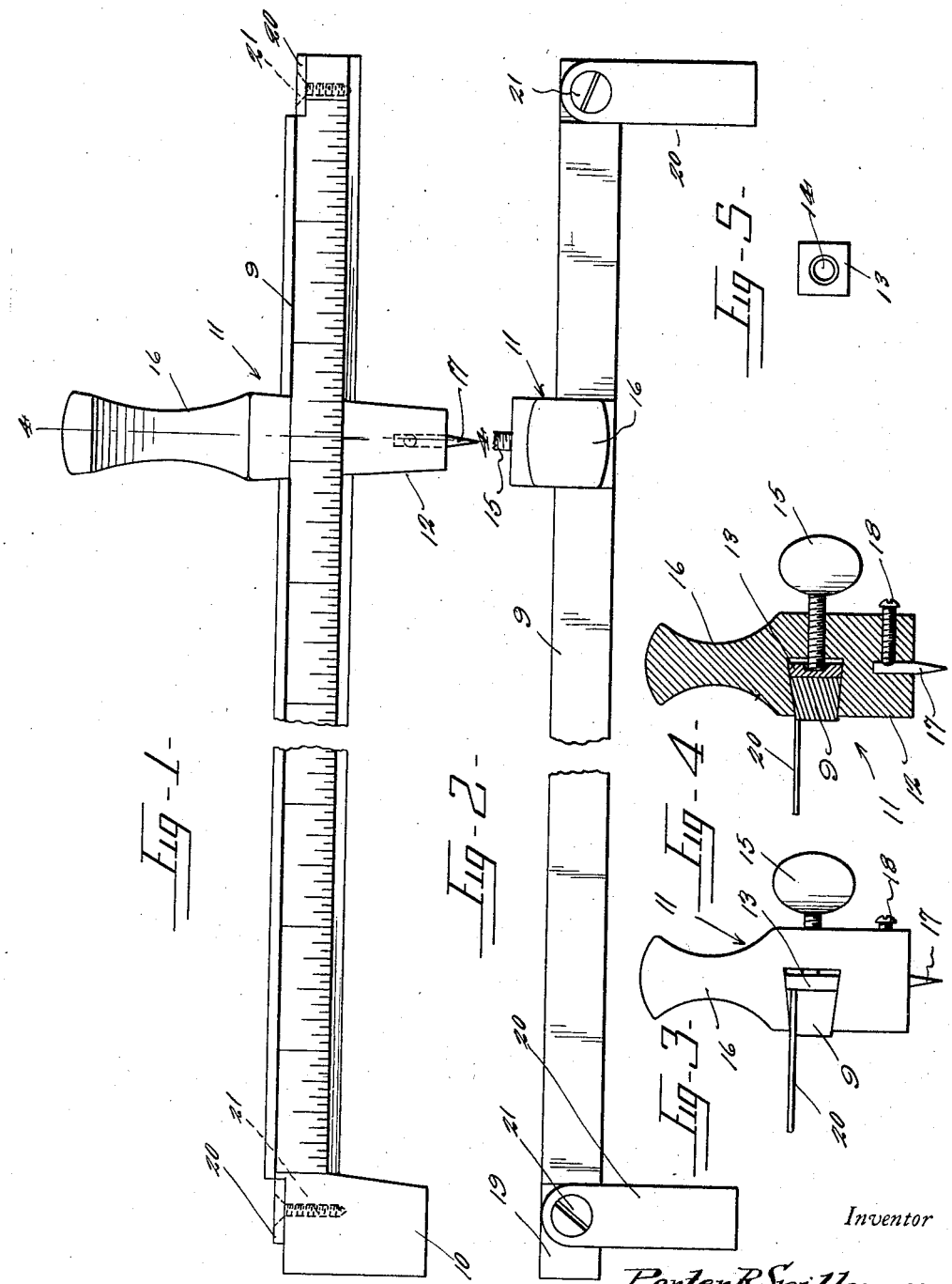

Patented Nov. 4, 1930

1,780,849

UNITED STATES PATENT OFFICE

PORTER R. SPILLMAN, OF SOUTH BEND, INDIANA

SIDING GAUGE AND SCRIBE

Application filed September 28, 1928. Serial No. 308,900.

This invention relates to an improved siding gauge in the form of a novel measuring instrument constructed to aid carpenters to place siding boards on a building or house in an even and accurate manner.

My principal aim is to generally improve upon measuring instruments of this class by providing one which is economical, practical in construction and use, accurate and dependable in action and so constructed as to produce the requirements of a device of this class in an efficient manner.

The particular structural features and their specific relationship will become more readily apparent from the following description and drawings.

In the drawings:—

Figure 1 is a side elevation of a measuring instrument for gauge constructed in accordance with the present invention.

Figure 2 is a similar elevational view taken at approximate right angles to Figure 1.

Figure 3 is an end view looking in a direction right to left to Figure 1.

Figure 4 is a sectional view taken approximately upon the plane of the line 4—4 of Figure 1.

Figure 5 is a detail view.

Figure 6 is an elevational view showing how two of the siding gauges are ordinarily employed.

Figure 7 is a section taken approximately upon the plane of the line 7—7 of Figure 6.

Figure 8 is a fragmentary elevational view showing a different method of use of the gauge.

In carrying out the invention I provide a measuring strip which may be conveniently designated as a rule 9, shown in Figures 3 and 4 this is of general wedge cross-section in shape. On one face it is provided with a graduated scale. At one end it is formed with an integral angular extension 10 which functions as an abutment. Cooperable with this stationary abutment is an adjustable slide generally designated at 11. This comprises a body which is shaped as shown in Figures 3 and 4 to provide an end extension 12 functioning as an adjustable abutment for cooperation with the first named abutment 10. The central portion of the slide has a wedge shaped opening of greater proportion than the cross sectional side of the rule 9 and arranged in this opening is a bearing plate 13 which is in sliding contact with one face of the rule and which is formed with a recess 14 for reception of the threaded shank of a thumb screw 15. The slide is also formed as at 16 to provide a single grip whereby it may be conveniently moved in the desired position along the scale. Moreover, the abutment 12 carries a removable anchoring spur 17 held in place by a retaining screw 18. The slide 11 is further provided with an index for co-action with the graduations on the rule 9 as clearly shown in Figure 1.

It is to be noted that the opposite end portions of the rule are formed with notches 19 in which metal fingers 20 are fastened as at 21. The width of each finger is equivalent to the depth of the notch so that the finger is substantially flush with one side face of the rule. The fingers are removably held in place by the fastening screws 21 so that they may be taken off when not necessary. The principal purpose of the fingers is to permit the rule to be used as a straight edge whereby an appropriate marking implement may be utilized for marking side boards of different lengths, particularly when they are too long to fit in the space existing. It is obvious that these fingers extend at right angles to the abutments 10 and 12.

The two principal uses of the gauge will be clear upon considering Figures 6, 7 and 8. In Figures 6 and 7 the reference character 22 designates one side board and 23 a supplemental side board. It is to be assumed that the board 22, for instance, has been already nailed in place. In order to produce the desired overlap of the next board 23, either two or more of the gauges are employed. Where the work is carried on with one man it is frequently necessary to use two of the gauges one at each end of the siding. In some instances, however, it is necessary to use a third gauge at the center of the siding in order to insure accurate placement of the side boards. It is obvious from these two figures that the abutment 10 is placed underneath the lower edge of the board 22, where it acts as a stop. Then the abutment 12 adjusted to the desired point on the scale whereby it serves as a rest for the lower edge of the upper side board 23. In making this placement of the last abutment the spur 17 is driven into the lower board as shown in Figure 7.

In Figure 8 it will be seen that the side board 24 is too long and in order that the extended end portion 25 may be accurately sawed off even with the inner edge of the vertical retaining board 26, the gauge is turned at right angles to the position previously assumed in order that the middle fingers may be placed against the inner edge of the board 26 above and below the board 24. Then a suitable marking instrument such a crayon, pencil or the like is drawn across the extended end portion 25 during which time the part 9 is utilized as a straight edge.

It is believed that by considering the description in connection with the drawings a clear understanding of the construction, uses and advantages of the improved siding gauge will be clear. Therefore, a more lengthy description is regarded as unnecessary.

Minor changes in shape, size and re-arrangement of details coming within the field of invention claimed may be resorted to in actual practice if desired.

I claim:—

A siding gauge comprising a graduated measuring stick functioning as a rule and provided at its opposite ends with notches and formed at one end with a right angularly disposed extension functioning as a stationary abutment, a slide comprising a body having an opening receiving said rule, a bearing plate located in said opening and in slidable contact with said rule, said bearing plate having a recess formed therein, a set screw carried by said slide and having its shank portion extending into said recess, the portions of said slide extending in opposite directions on opposite sides of said rule, one portion being formed to provide a hand grip, the other portion constituting a slidable abutment for cooperation with the first-named abutment, the last named portion being equipped with an anchoring spur, and a pair of metal fingers removably mounted in the notches at the ends of said rule, said fingers extending in a direction at right angles to said abutments and to said rule.

In testimony whereof I affix my signature.

PORTER R. SPILLMAN.